(12) United States Patent  
Sakai et al.

(10) Patent No.: US 7,997,655 B2
(45) Date of Patent: Aug. 16, 2011

(54) SEAT DRIVING APPARATUS (75) Inventors: Morio Sakai, Toyota (JP); Toshiro Maeda, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 276 days.

(21) Appl. No.: 12/408,849

(22) Filed: Mar. 23, 2009

(65) Prior Publication Data
US 2009/0284062 A1 Nov. 19, 2009

(30) Foreign Application Priority Data

May 19, 2008 (JP) .................................. 2008-130881

(51) Int. Cl.
*B60N 2/02* (2006.01)
(52) U.S. Cl. ............... 297/362.11; 297/362; 297/362.12
(58) Field of Classification Search .................. 297/362, 297/362.11, 362.12; 74/425, 390, 395, 404, 74/405, 406
See application file for complete search history.

(56) References Cited

U.S. PATENT DOCUMENTS

| | | | | |
|---|---|---|---|---|
| 4,986,513 A * | 1/1991 | Schultz et al. | ............. | 256/65.06 |
| 5,277,672 A * | 1/1994 | Droulon et al. | ............... | 475/176 |
| 7,086,699 B1 | 8/2006 | Addison et al. | | |
| 7,090,298 B2 * | 8/2006 | Lange | ............ | 297/362 |
| 7,513,573 B2 * | 4/2009 | Wahls et al. | .................... | 297/362 |
| 7,520,568 B2 * | 4/2009 | Hoshihara et al. | ......... | 297/367 R |
| 7,544,142 B2 * | 6/2009 | Schuler et al. | ................ | 475/149 |
| 7,673,943 B2 * | 3/2010 | Ohta et al. | ............... | 297/362.11 |
| 2005/0110322 A1 * | 5/2005 | Cha | ................. | 297/362 |
| 2008/0001458 A1 | 1/2008 | Hoshihara et al. | | |
| 2009/0021066 A1 * | 1/2009 | Nathan et al. | .................. | 297/362 |

FOREIGN PATENT DOCUMENTS

JP 2007-261325 10/2007

* cited by examiner

*Primary Examiner* — Sarah B McPartlin
(74) *Attorney, Agent, or Firm* — Oblon, Spivak, McClelland, Maier & Neustadt, L.L.P.

(57) ABSTRACT

A seat driving apparatus includes: a gear transmission mechanism, preventing a backlash by means of the wedge member applied with a biasing force of a biasing member and transmitting a torque; an actuator, operating a seatback of a seat; and a control unit, controlling driving of the actuator. The control unit includes a seat operation mode in which the actuator is driven to operate the seatback at a predetermined speed and a creep mode in which the actuator is driven at a slower speed than a speed in the seat operation mode. The actuator is driven in the creep mode until a load for releasing the holding of the gear transmission mechanism is applied to the wedge member and subsequently the actuator is driven in the seat operation mode when the seatback is operated in an opposite direction from the previous operational direction thereof.

7 Claims, 9 Drawing Sheets

SEAT DRIVING APPARATUS

CROSS REFERENCE TO RELATED APPLICATIONS

This application is based on and claims priority under 35 U.S.C. §119 to Japanese Patent Application 2008-130881, filed on May 19, 2008, the entire contents of which is incorporated herein by reference.

FIELD OF THE INVENTION

The present invention relates to a seat driving apparatus including a gear transmission mechanism, an actuator and a control unit.

BACKGROUND

A known reclining device for a vehicle for adjusting an angle of a seatback is disclosed in JP2007-261325A (which will be referred to as reference 1 hereinbelow). The reclining device according to reference 1 is provided between a lower frame, which serves as a supporting member of a seat cushion and is provided at each left and right ends of a seat and an upper frame, which serves as a supporting member of the seatback. The reclining device includes a planetary-gear power transmission mechanism. In the power transmission mechanism, an external gear, which is formed at a lower bracket fixed at the lower frame, and an internal gear, which is formed at an upper bracket fixed at the upper frame, are engaged with each other. Wedge-shaped wedge members are disposed between the lower bracket and the upper bracket. When a driving shaft is rotated, the wedge members are rotated in response to the rotation of the driving shaft, an axis of the external gear revolves around an axis of the internal gear and an engagement position between the external gear and the internal gear is rotated in a planar surface of the planetary rotation. When the engagement position between the external gear and the internal gear is rotated by one rotation, the upper bracket is rotated relative to the lower bracket by an angle corresponding to a difference in number of teeth between the external and internal gears. The wedge members are provided to be in pairs. The wedge members are applied with a biasing force by a ring-shaped spring, serving as a biasing member, so that the external gear is thrust to the internal gear. Consequently, a backlash is prevented from being generated at the engagement position between the external gear and the internal gear. Therefore, an angular position of the seatback is firmly held. Further, the angular position of the seatback may be changed by forward and reverse rotations of the driving shaft by means of a motor having a speed reduction mechanism.

According to the seat driving apparatus assembled with the gear transmission mechanism, the backlash is prevented from being generated at the gear transmission mechanism and the angular position of the seatback is firmly held by an engagement of the wedge members. In order to further adjust the angle of the seatback, the engagement of the wedge members needs to be released. Therefore, the wedge members are applied with a load to be displaced by a driving force of the actuator. However, an operation by means of preparatory driving at low load (which will be referred to as a low load preparatory operation, hereinbelow) is provided before the wedge members are applied with the load when the seatback is operated in an opposite direction from the previous operation. Consequently, the low load preparatory operation and a subsequent impact of load application are transmitted to the seatback as uncomfortable shaking.

A need thus exits for a seat apparatus for a seat driving apparatus, which is not susceptible to the drawback mentioned above.

SUMMARY OF THE INVENTION

According to an aspect of the present invention, a seat driving apparatus includes: a gear transmission mechanism, preventing a backlash by holding a gear engagement by means of the wedge member applied with a biasing force of a biasing member and transmitting a torque by displacing a wedge member; an actuator, operating a seatback of a seat via the gear transmission mechanism; and a control unit, controlling driving of the actuator. The control unit includes a seat operation mode in which the actuator is driven to operate the seatback at a predetermined speed and a creep mode in which the actuator is driven at a slower speed than a speed in the seat operation mode. The actuator is driven in the creep mode until a load for releasing the holding of the gear transmission mechanism is applied to the wedge member and subsequently the actuator is driven in the seat operation mode when the seatback is operated in an opposite direction from the previous operational direction thereof.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
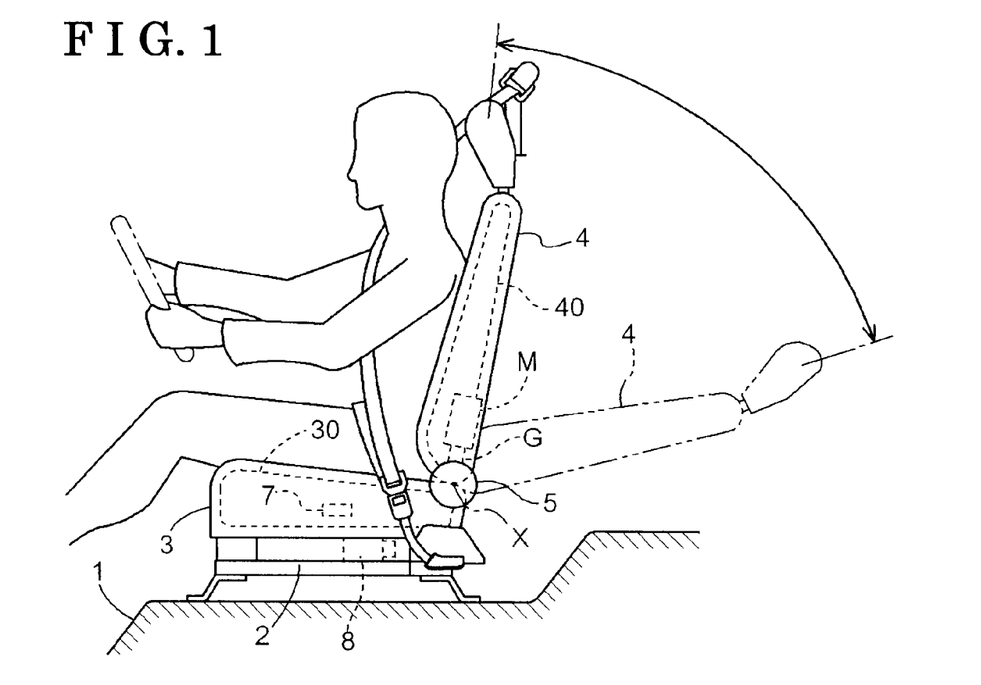
FIG. 1 is a side view illustrating a seat having a seatback controlled to be driven by the seat driving apparatus according to the embodiment.
Figure 2:
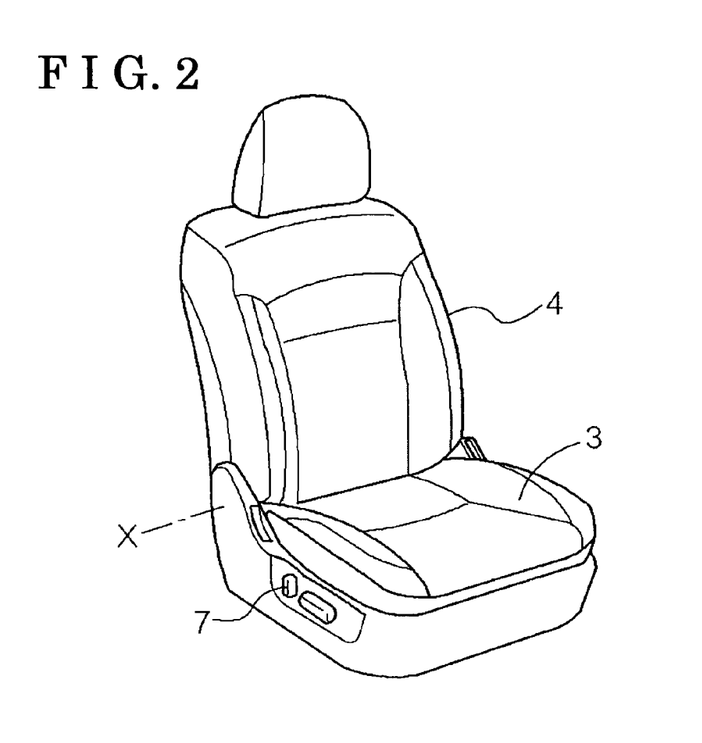
FIG. 2 is a perspective view illustrating the seat shown in FIG. 1.

A detailed description of an embodiment of a seat driving apparatus will be provided hereinbelow with reference to the attached drawings. FIGS. 1 and 2 illustrate a seat, which is movable relative to a vehicle floor 1 in a front-rear direction of the seat via rail members 2. The seat includes a seat cushion 3, on which an occupant can be seated, and a seatback 4. The seatback 4 is supported to rotate around an axis X, which extends in a left-right direction of the seat, relative to a rear portion of the seat cushion 3. The seat cushion 3 is supported by a lower frame 30. The seatback is supported by an upper frame 40. The lower frame 30 and the upper frame 40 are connected to each other to rotate relative to each other around the axis X via a hinge structure, a shaft structure and the like.

Further, the seat driving apparatus includes an electric motor (an actuator) M, worm wheel gear mechanisms G and planetary gear transmission mechanisms 5, in order to rotate the seatback 4 relative to the seat cushion 3 around the axis X. Each of the worm wheel gear mechanisms G reduces a speed of a driving torque of the electric motor M and then outputs an operational force. The worm wheel gear mechanisms G are provided at left and right sides of the seat, respectively. Further, The gear transmission mechanisms 5 are provided at the left and right sides of the seat, respectively. The gear transmission mechanisms 5 operate the seatback 4 by inputting thereto the operational force outputted from the worm wheel gear mechanisms G. A direct current motor is applied to the rotational motor M in the embodiment.

A control unit 8 is provided at a lower portion of the seat cushion 3. The control unit 8 controls driving of the electric motor M. An operational angle adjusting switch 7 for adjusting an operational angle (a reclining angle) of the seatback 4 is provided at a side surface of the seat cushion 3 and connected to the control unit 8. The seatback 4 is operated to be positioned at a selected position via the gear transmission mechanisms 5 by the electric motor M, which is driven by an operation of the operational angle adjusting switch 7.

Figure 3:
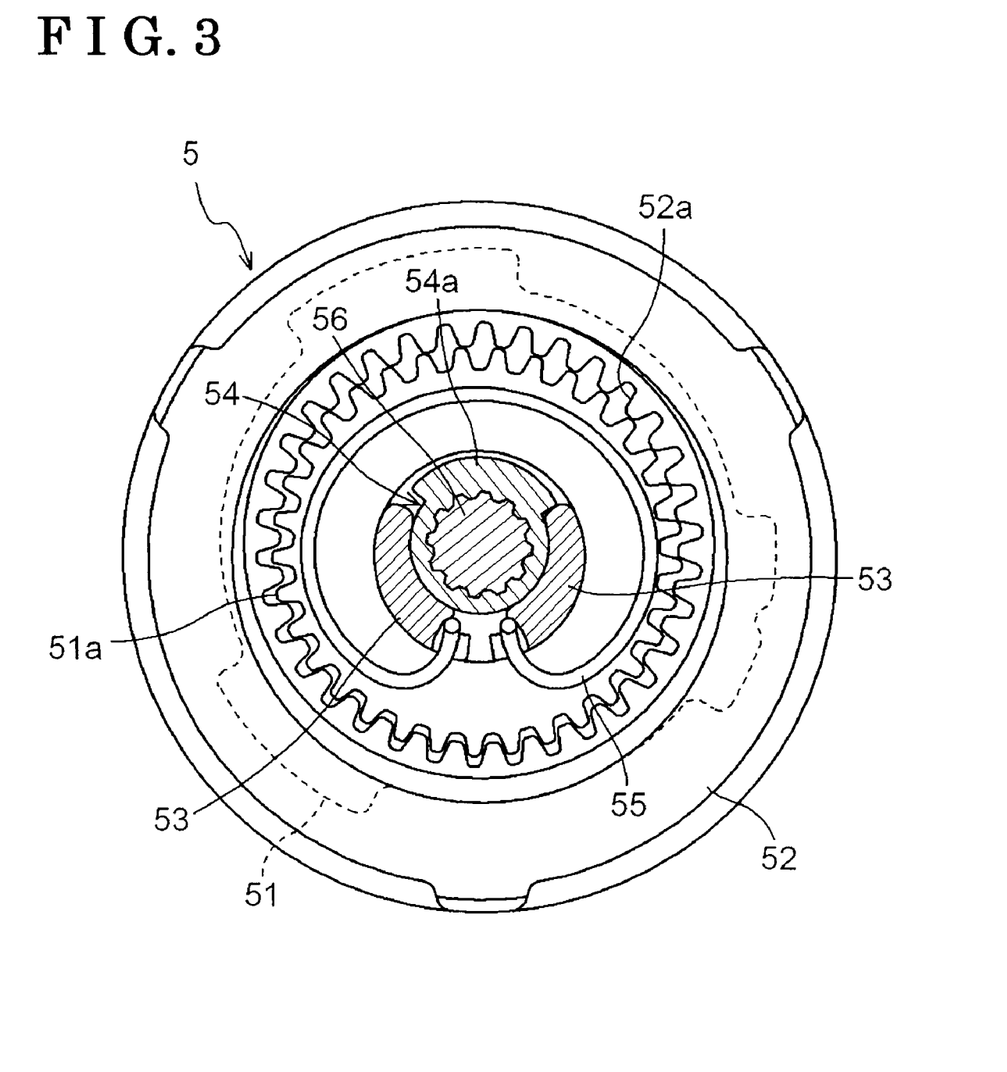
FIG. 3 is a side view illustrating an example of a planetary gear transmission mechanism.

Structures and functions of the left and right worm wheel gear mechanisms G are substantially the same. Structure and functions of the left and right gear transmission mechanisms 5 are substantially the same. Therefore, only one of the worm wheel gear mechanisms G and one of the gear transmission mechanisms 5 will be described hereinbelow as an example. As illustrated in FIG. 3, the planetary gear transmission mechanism 5 is formed into a substantially disc shape. A lower bracket 52, which forms a side surface of the disc shape, is fixed at the lower frame 30. An upper bracket 51, which forms the other side surface of the disc shape, is fixed at the upper frame 40. The lower bracket 52 and the upper bracket 51 are engaged with each other to rotate relative to each other and to lock the relative rotation. A rotational axis of the lower bracket 52 and the upper bracket 51 serves as a rotational axis of the seatback 4 relative to the seat cushion 3.

The planetary gear transmission mechanism 5 is operated by engaging an external gear 51a, formed at the upper bracket 51, with an internal gear 52a, formed at the lower bracket 52. The external gear 51a includes a less number of teeth than the number of teeth of the internal gear 52a. A detailed description thereof will not be provided in the embodiment because a basic principle of a planetary gear transmission mechanism is known. The detailed description of the basic principle of the planetary gear transmission mechanism is provided in JP2007-143576A and JP2007-160010A, for example.

An aspect of the gear transmission mechanism 5 is that a pair of wedge members 53 is provided between the upper bracket 51 and the lower bracket 52. Each of the wedge members 53 is formed into a substantially wedge shape. When a shaft 54, which serves as an operation input shaft, is rotated, a position of the wedge members 53 are rotated in a planar surface shown in FIG. 3. An axis of the external gear 51a revolves around an axis of the internal gear 52a. An engagement position between the external gear 51a and the internal gear 52a is rotated in the planar surface shown in FIG. 3. When the engagement position between the external gear 51a and the internal gear 52a is rotated by one rotation, the upper bracket 51 is rotated relative to the lower bracket 52 by an angle corresponding to a difference in number of teeth between the external gear 51a and the internal gear 52a.

The wedge members 53 are configured to be in pairs. A spring (a biasing member) 55, which is formed into a substantially ring shape, is provided between the wedge members 53. The spring 55 applies a biasing force to the wedge members 53. The external gear 51a is thrust to the internal gear 52a via the wedge members 53 by an application of the biasing force. Even when an excessive load is applied to the upper bracket 51 by the upper frame 40 in a state where the external gear 51a and the internal gear 52a are engaged with each other, the engagement position between the external gear 51a and the internal gear 52a is not changed because of a thrusting force. Therefore, the reclining angle, that is the operational angle of the seatback 4, is firmly held. Thus, an angular position holding mechanism is configured by the wedge members 53 and the spring 55.

Figure 4:
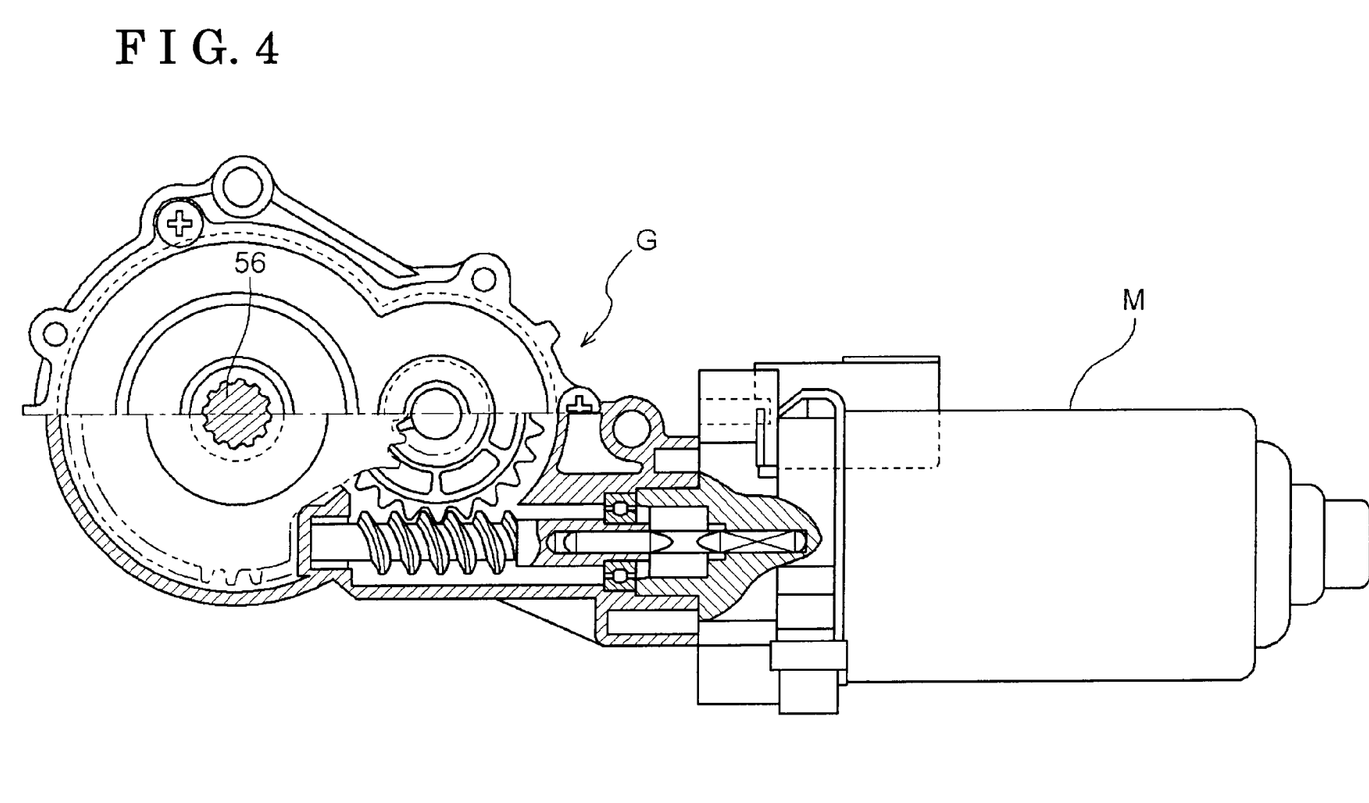
FIG. 4 is a side view illustrating a relationship between the gear transmission mechanism and an electric motor.

As illustrated in FIG. 4, the worm wheel gear mechanism G is provided at a rotational shaft of the electric motor M, which serves as a driving source. The worm wheel gear mechanism G includes a worm gear set and a speed reduction gear set. The speed reduction gear set further reduces a speed of an output of the worm gear set. A final output gear of the worm wheel gear mechanism G is fixed at an output shaft 56. The output shaft 56 is connected to the shaft 54. Therefore, an output of the worm wheel gear mechanism G is transmitted to the shaft 54. As schematically illustrated in FIGS. 5A, 5B, 6A, 6B and 6C, a protruding portion 54a is provided at the shaft 54. The protruding portion 54a protrudes from the shaft 54 in a radial direction thereof. The protruding portion 54a is provided between the wedge members 53. When the protruding portion 54a contacts the wedge members 53 and is rotated integrally therewith, the external gear 51a is rotated eccentrically relative to the internal gear 52a. The internal gear 52a is rotated by the angle corresponding to the difference in number of teeth between the external gear 51a and the internal gear 52a when the external gear 51a is rotated by one rotation.

Figure 5A:
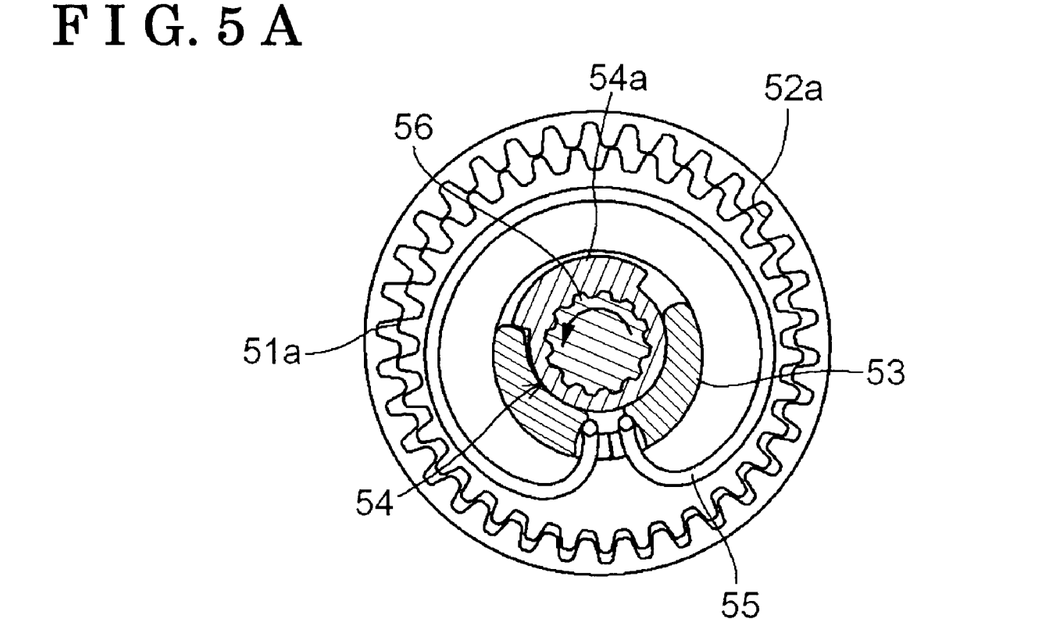
FIG. 5A is a schematic view illustrating a relationship between a protruding portion of a shaft and a wedge member when a seatback is operated in the same direction as the previous operation.
Figure 5B:
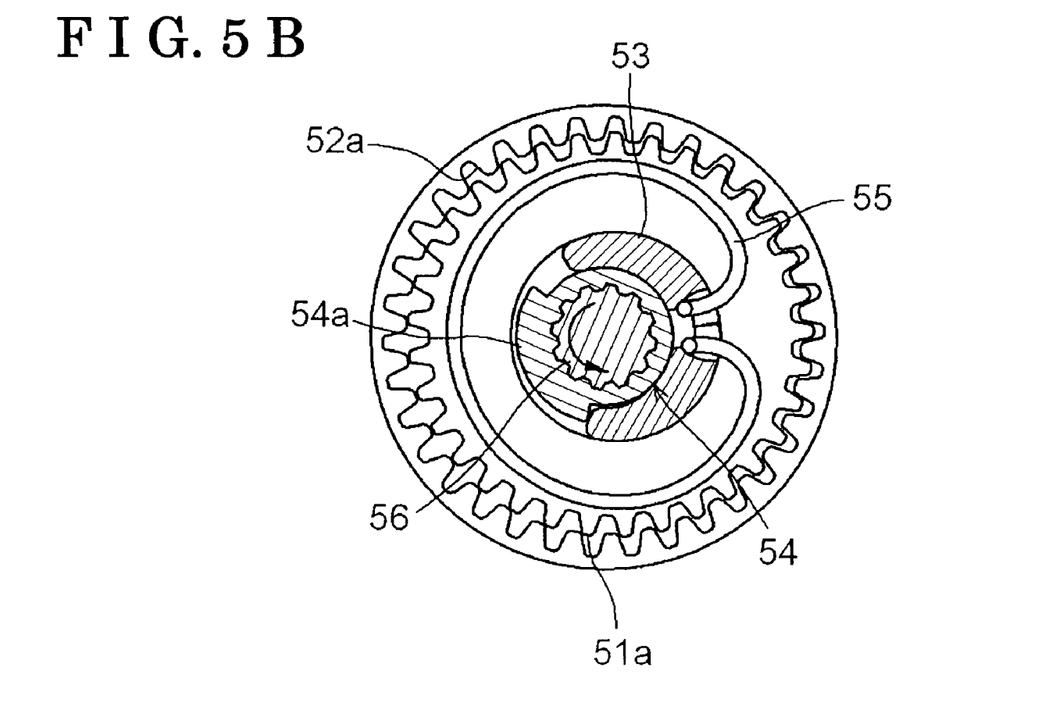
FIG. 5B is a schematic view illustrating the relationship between the protruding portion of the shaft and the wedge member when the seatback is operated in the same direction as the previous operation.
Figure 6A:
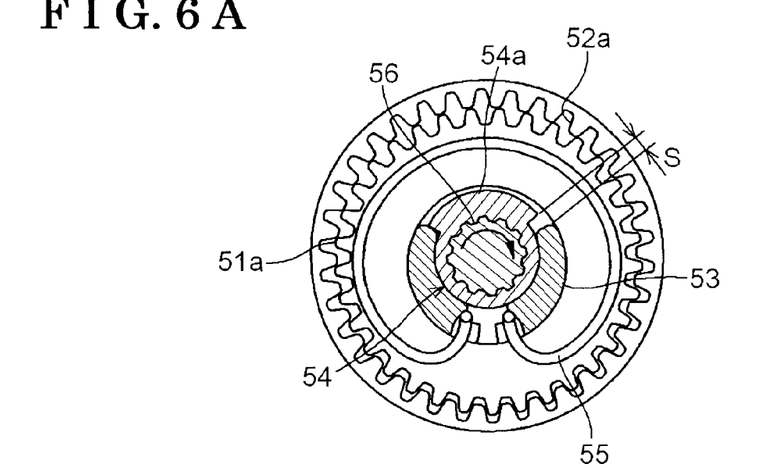
FIG. 6A is a schematic view illustrating the relationship between the protruding portion of the shaft and the wedge member when the seatback is operated in an opposite direction as the previous operation.
Figure 6B:
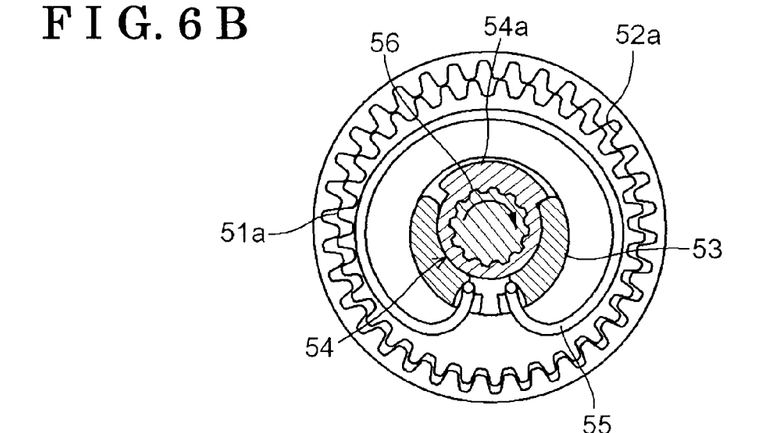
FIG. 6B is a schematic view illustrating the relationship between the protruding portion of the shaft and the wedge member when the seatback is operated in the opposite direction as the previous operation.
Figure 6C:
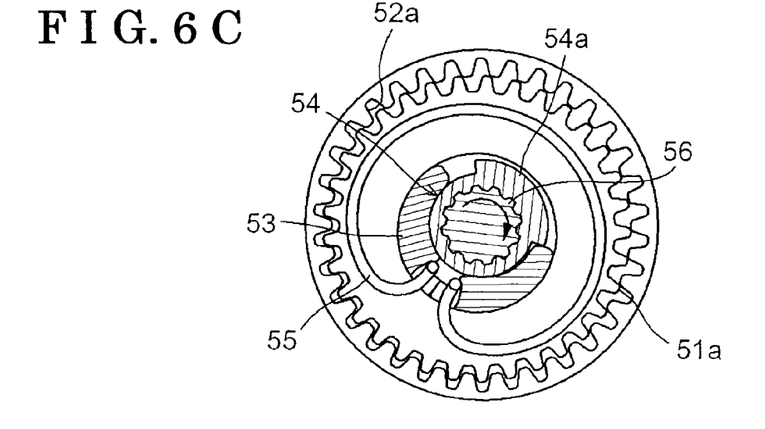
FIG. 6C is a schematic view illustrating the relationship between the protruding portion of the shaft and the wedge member when the seatback is operated in the opposite direction as the previous operation.

The biasing force is applied to the wedge members 53 in a direction in which an amount of eccentricity of the external gear 51a relative to the internal gear 52a is increased, in order to prevent a backlash from being generated at an engagement portion between the external gear 51a and the internal gear 52a. As illustrated in FIGS. 5A, 5B, 6A, 6B and 6C, a length of the protruding portion 54a of the shaft 54 in the circumferential direction thereof is smaller than a length of a gap generated between the wedge members 53 in the circumferential direction thereof. When the shaft 54 rotates the wedge members 53 in the same direction as a previous operation, a contact of the protruding portion 54a with the corresponding wedge member 53 is maintained. Therefore, as illustrated in FIGS. 5A and 5B, a thrusting load is applied to the wedge members 53 to release the engagement of the wedge members 53 and to rotate the wedge members 53. FIG. 5A illustrates a stage in which the protruding portion 54a of the shaft 54 starts to rotatably displace the wedge members 53 against the biasing force of the spring 55. FIG. 5B illustrates a stage in which the external gear 51a is eccentrically rotated by approximately 90 degrees by rotatably displacing the wedge members 53. On the other hand, FIGS. 6A, 6B and 6C illustrate a movement in which the shaft 54 rotates the wedge members 53 in an opposite direction from the previous operation. As illustrated in FIG. 6A, a clearance S is provided between the protruding portion 54a and one of the wedge members 53 in a rotational direction of the protruding portion 54a. Because the clearance S is provided between the protruding portion 54a and one of the wedge members 53 in the rotational direction of the protruding portion 54a, the protruding portion 54a is idly moved until the protruding portion 54a comes in contact with one of the wedge members 53. In other words, the protruding portion 54a is idly moved for a distance defined by the clearance S. The idle movement corresponding to the clearance S serves as a low load preparatory operation according to the embodiment. After the low load preparatory operation, the protruding portion 54a comes in contact with the corresponding wedge member 53 to release the engagement of the wedge members 53 and to rotate the wedge members 53. FIG. 6A illustrates a stage in which the protruding portion 54a of the shaft 54 starts to be rotatably displaced (i.e., the protruding portion 54a of the shaft 54 starts the low load preparatory operation). FIG. 6B illustrates a stage in which the protruding portion 54a of the shaft 54 contacts one of the wedge members 53 (i.e., the protruding portion 54a of the shaft 54 completes the idle movement corresponding to the clearance S). FIG. 6C illustrates a stage in which the protruding portion 54a of the shaft 54 rotatably displaces the wedge members 53a while the protruding portion 54a thrusts the wedge members 53. In the stage shown in FIG. 6C, the external gear 51a is eccentrically rotated by approximately 45 degrees. According to the embodiment, as will be described in detail hereinbelow, the electric motor M is controlled so that the low load preparatory operation of the protruding portion 54a is operated at an significantly low speed. Consequently, the protruding portion 54a comes in contact with one of the wedge members 53 to release the engagement of the wedge members 53.

Figure 7:
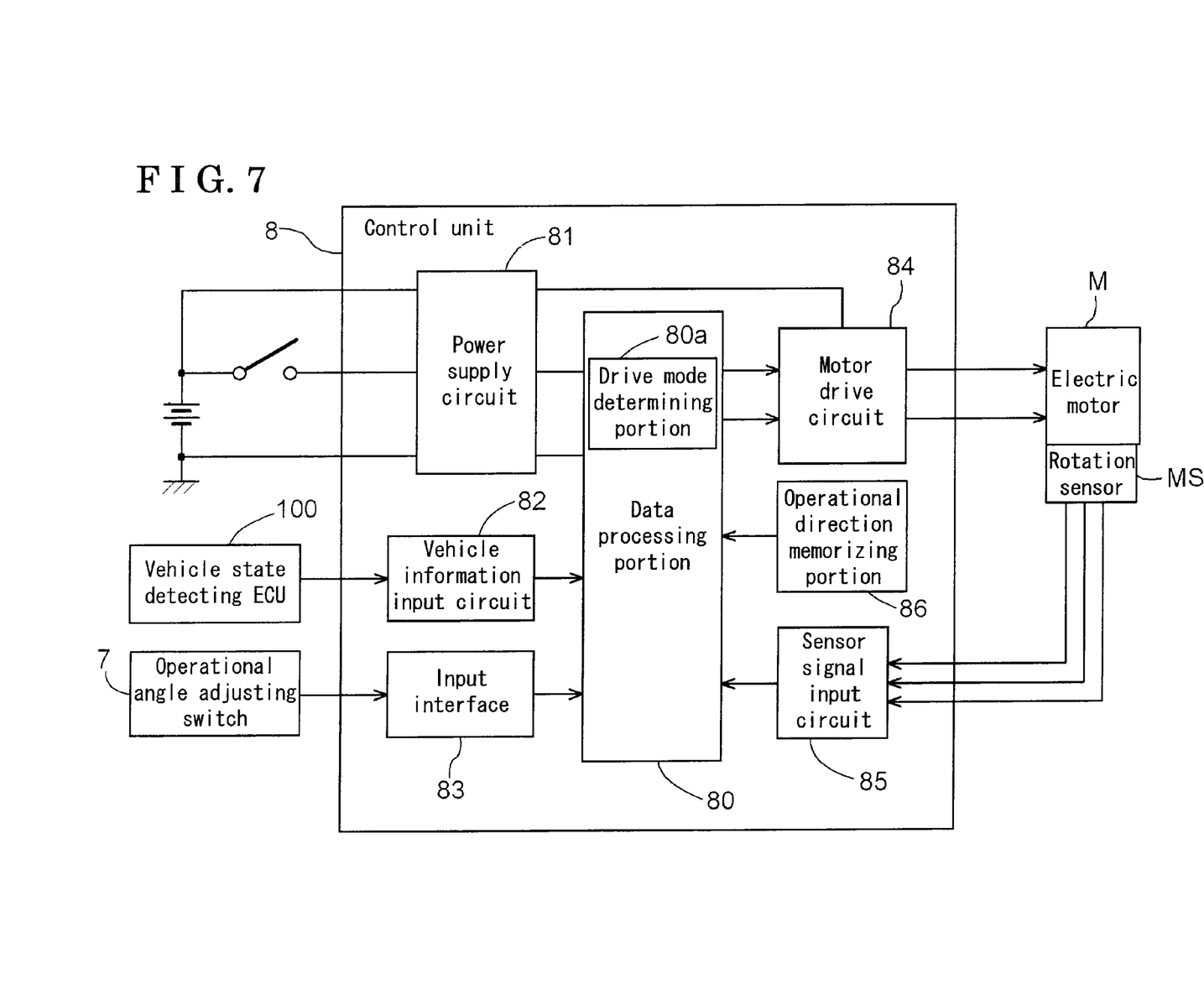
FIG. 7 is a block diagram illustrating functions related to a control unit.

The control unit 8 of the seat driving apparatus according to the embodiment is illustrated in FIG. 7. The control unit 8 is configured by having an electronic device, such as a one chip microcomputer, as a core member thereof. The control unit 8 includes a data processing portion 80, a power supply circuit 81, a vehicle information input circuit 82, an input interface 83, a motor drive circuit 84, a sensor signal input circuit 85 and an operational direction memorizing portion 86. The power supply circuit 81 controls electric power from a power source. The input interface 83 obtains an operational signal from the operational angle adjusting switch 7. The motor drive circuit 84 controls electric power, which is supplied to the electric motor M. The sensor signal input circuit 85 obtains a feedback signal from a rotation sensor MS, which is provided at the electric motor M. The operational direction memorizing portion 86 memorizes an operational direction of the seatback 4 every time the seatback 4 is operated. The control unit 8 and a vehicle state detecting electronic control unit (which will be hereinbelow referred to as a vehicle state detecting ECU) 100 are network-connected. The vehicle state detecting ECU 100 includes various functions for detecting a vehicle state. For example, the vehicle state detecting ECU 100 evaluates a possibility of a vehicle collision based on a distance to an obstacle, a relative speed and the like on the basis of an output signal from a collision predicting sensor. The vehicle state detecting ECU 100 then outputs a collision predicting information as an emergency information. The collision predicting sensor may be configured by, for example, a millimeter wave radar, which detects the obstacle around the vehicle, an image recognition device, and the like.

The data processing portion 80 may be configured to include various functions depending on programs. In the embodiment, the data processing portion 80 includes a drive mode determining portion 80a. The drive mode determining portion 80a determines a drive mode of the electric motor M. The drive mode, which is determined by the drive mode determining portion 80a, includes a seat operation mode and a creep mode. The electric motor M is driven so that the seatback 4 is operated at a predetermined speed in the seat operation mode. The electric motor M is driven in the creep mode at a speed, which is slower than a driving speed of the electric motor M in the seat operation mode. When the operational angle adjusting switch 7 is operated manually to adjust a position of the seatback 4, the electric motor M is driven at a predetermined low speed. The seat operation mode includes a mode in which the electric motor M is driven at a predetermined speed and a mode in which the electric motor M is driven at a speed calculated on the basis of a signal from the rotational sensor MS. The data processing portion 80 calculates a duty ratio. The motor drive circuit 84 generates a pulse on the basis of the duty ratio. Then, the electric motor M is driven at a selected speed according to the pulse. The data processing portion 80 includes an emergency drive mode. In the emergency drive mode, when an emergency occurrence, such that the vehicle abnormally approaches the obstacle and the like, is transmitted from the vehicle state detecting ECU 100, the seatback 4 is operated to be positioned at a predetermined position at a high speed so that an occupant is restrained in an appropriate seating posture. When a high capacity motor is applied to operate the seatback 4 to be positioned at the predetermined position at the high speed in the emergency drive mode, an operational speed of the seatback 4 during the low load preparatory operation is a high speed according to a conventional control. Therefore, the occupant may easily feel uncomfortable. Accordingly, the embodiment may be applied to a seat driving apparatus for a vehicle having an emergency drive mode for operating a seatback at the high speed.

The rotation sensor MS includes a photointerrupter or a Hall element for detecting rotation of the electric motor M, each of which is provided at a rotational shaft of the electric motor M. The sensor signal input circuit 85 obtains a signal from the rotation sensor MS and provides the signal to the data processing portion 80.

Figure 8A:
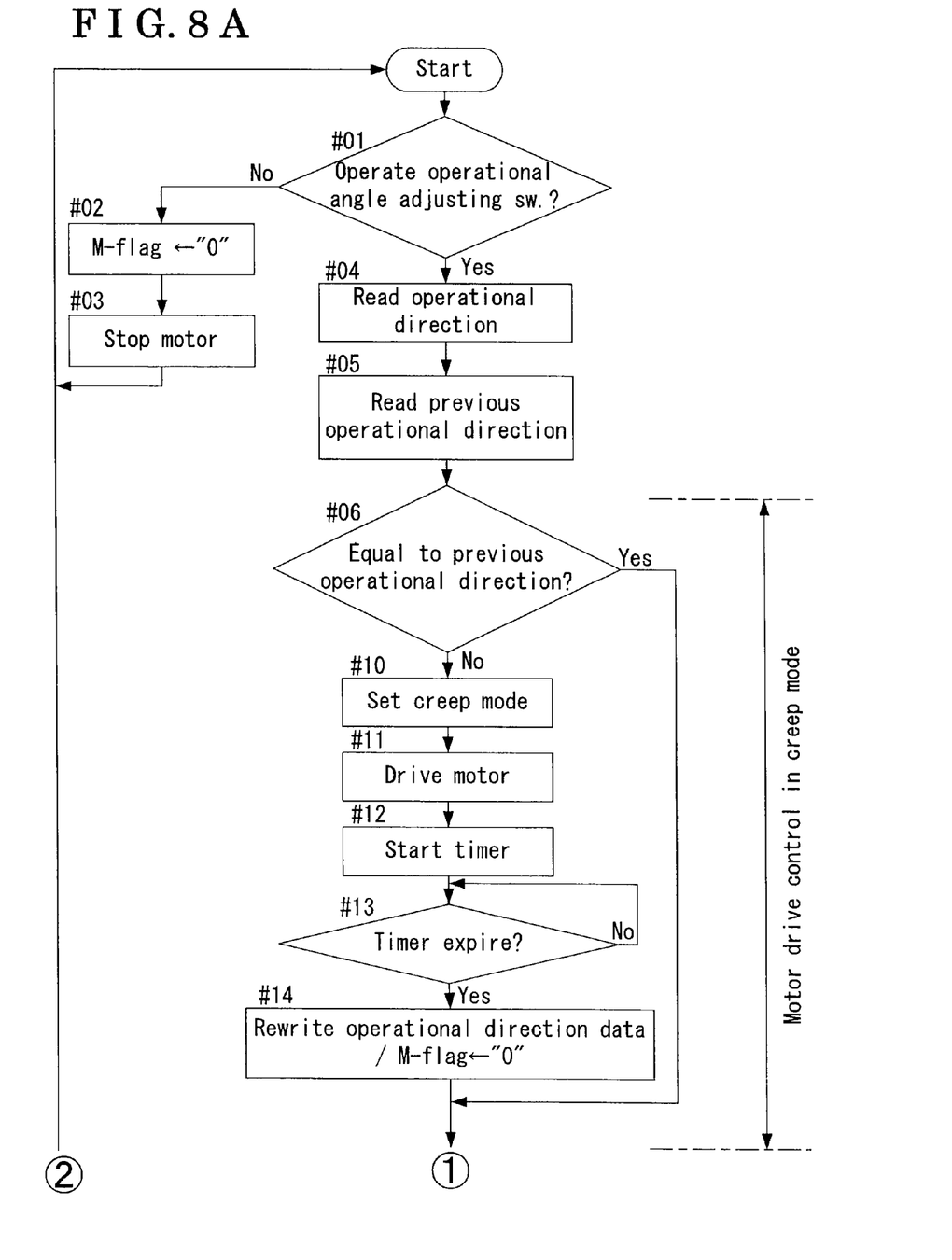
FIG. 8A is a flow chart illustrating a configuration of control of the electric motor on the basis of an operational angle adjusting switch.
Figure 8B:
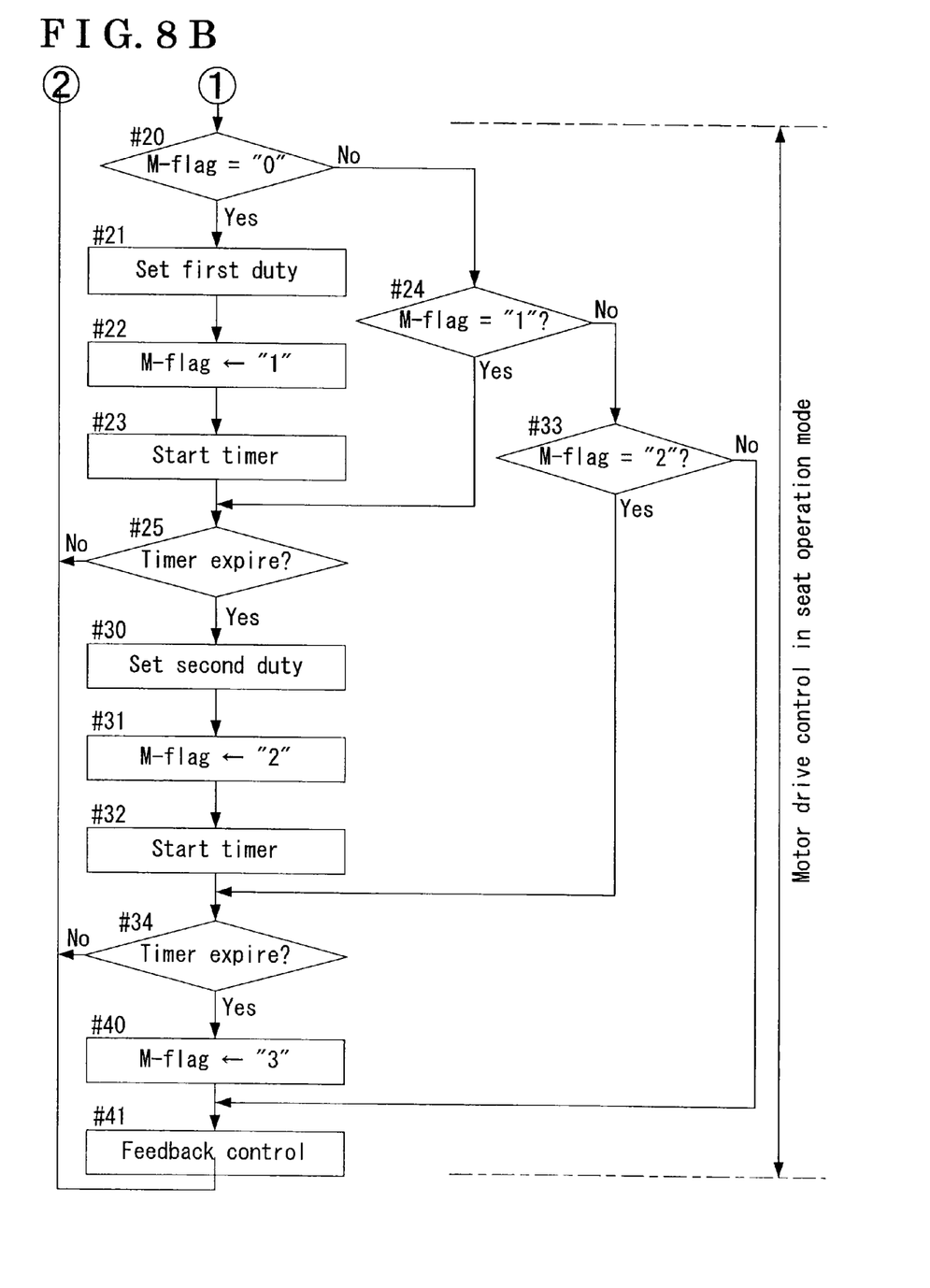
FIG. 8B is a flow chart illustrating the configuration of control of the electric motor on the basis of the operational angle adjusting switch.

A configuration of control of the electric motor M on the basis of the operational angle adjusting switch 7 will be described hereinbelow with reference to flow charts shown in FIGS. 8A and 8B. Whether or not the operational angle adjusting switch 7 is operated or not is checked (#01). When the operational angle adjusting switch 7 is not operated (#01, No), "0" is set in a M-flag (#02). In a case where the electric motor M is driven, the electric motor M is stopped (#03).

When the operational angle adjusting switch 7 is operated (#01, Yes), the operational direction of the seatback 4, which is determined by the operational signal of the operational angle adjusting switch 7, is read (#04). Data of the previous operational direction is read from the operational direction memorizing portion 86 (#05). Whether or not the present operational direction and the previous operational direction are equal to each other or not is checked by comparing the operational direction read in step #04 with the operational direction read in step #05 (#06). When the present operational direction and the previous operational direction are not equal to each other (#06, No), as described above, the electric motor M is driven in the creep mode during a time of the low load preparatory operation where the protruding portion 54a comes in contact with the corresponding wedge member 53. The creep mode is set in a driving control of the electric motor M (#10). The electric motor M is driven (#11). A timer is started (#12). The timer is set to expire after a pre-calculated time of the low load preparatory operation. Therefore, the electric motor M is driven in the creep mode only during the time of the low load preparatory operation (#13). When the timer expires (#13, Yes), the present operational direction, defined by a rotational direction of the electric motor M, is written in the operational direction memorizing portion 86. Data of the operational direction is rewritten and "0" is set in the M-flag (#14). A routine from step #10 to step #15 is a driving control of the electric motor M in the creep mode. When the present operational direction and the previous operational direction are equal to each other (#06, Yes), the routine of the driving control of the electric motor M from step #10 to step # 15 is omitted.

Figure 9:
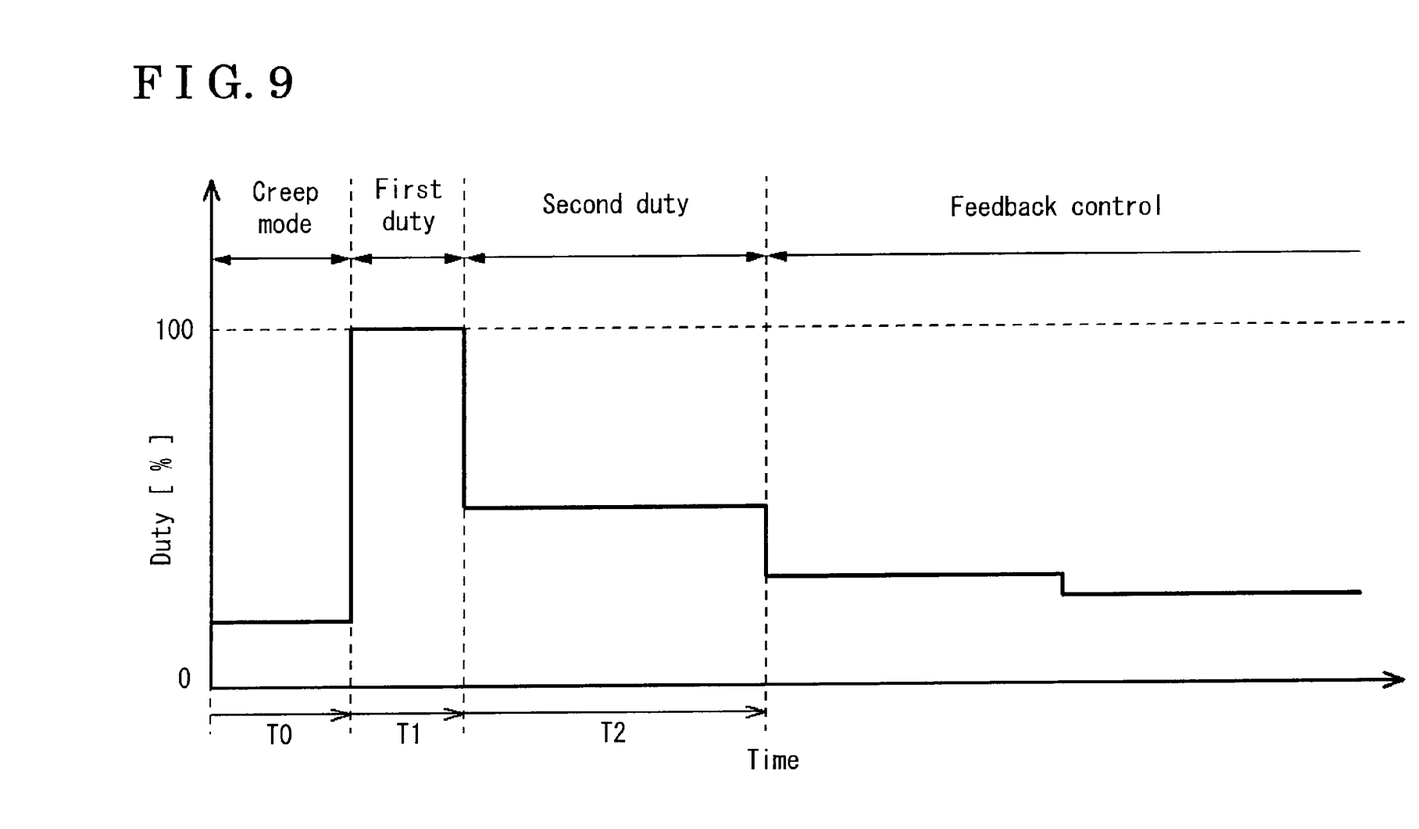
FIG. 9 is a time chart illustrating a duty ratio of the electric motor used to control an operation of the seatback.

After the driving control of the electric motor M in the creep mode is ended, the driving control of the electric motor M in the seat operation mode is executed. The driving control of the electric motor M in the seat operation mode according to the embodiment will be described hereinbelow. FIG. 9 is a time chart illustrating switch of settings of the duty ratio according to the driving control of the electric motor M in the creep mode and in the subsequent seat operational mode. A minimum duty ratio of an approximately 10 to 20% duty ratio is set in the creep mode. The electric motor M is driven for a predetermined time T0 to operate the low load preparatory operation of the protruding portion 54a of the shaft 54 in the creep mode. Subsequently, the electric motor M is driven at a 100% duty ratio (a first duty) for a predetermined time T1. Further, the electric motor M is driven at a low duty ratio of an approximately 50% duty ratio (a second duty) when the seatback 4 starts to be operated for a predetermined time T2. Consequently, the seatback 4 smoothly starts to be operated from a stationary state. Subsequently, a feedback control is executed on the basis of the feedback signal from the rotation sensor MS.

According to the driving control of the electric motor M in the seat operation mode, whether or not the M-flag is "0" (#20) is checked. The fact that the M-flag is "0" indicates a start time of the seat operation mode (#20, Yes). Therefore, the first duty (the 100% duty ratio according to the embodiment) is set (#21). Consequently, the electric motor M is driven at full power to start to operate the seatback 4. Further, "1" is set in the M-flag (#22) and the timer is started (#23). The electric motor M is driven for the predetermined time T1 at the first duty. Therefore, when step #20 is No, whether or not the M-flag is "1" (#24) is checked. When the M-flag is "1", whether or not the timer reaches the predetermined time T1 is checked in step #25. A routine from step #20 to step #25 is the driving of the electric motor M at the first duty. The routine is recognized by the fact that the M-flag is "1".

When the timer reaches the predetermined time T1 in step #25 (#25 Yes), the routine of the driving the electric motor M at the first duty is ended and the routine of the driving the electric motor M at the second duty is started. The second duty (the approximately 50% duty ratio according to the embodiment) is set (#30). Consequently, the electric motor M is driven at approximately half power of full power to further operate the seatback 4. "2" is set in the M-flag (#31) and the timer is started (#32). The electric motor M is driven for the predetermined time T2 at the second duty. When steps #20 and #24 are No, whether or not the M-flag is "2" is checked (#33). When the M-flag is "2", whether or not the timer reaches the predetermined time T2 is checked in step #34. A routine from step #30 to step #34 is the driving of the electric motor M at the second duty. The routine is recognized by the fact that the M-flag is "2".

When the timer reaches the predetermined time T2 in step #34 (#34, Yes), the routine of driving the electric motor M at the second duty is ended and the feedback control on the basis of the feedback signal from the rotation sensor MS is started. "3" is set in the M-flag (#40) and the seatback 4 starts to be operated according to the feedback control. The feedback control itself is known. The seatback 4 is operated at a constant target speed on the basis of the feedback signal obtained from the rotation sensor MS via the sensor signal input circuit 85. When the feedback control is executed, the M-flag is "3". Therefore, steps #20, #24 and #33 are no. Accordingly, the feedback control continues until the operation of the operational angle adjusting switch 7 is changed (i.e., the operational angle adjusting switch is either turned off or is operated in the opposite direction). As describe above, the driving control of the electric motor M in the seat operation mode is executed according to the routine from step #20 to step #41. Although omitted in the flow chart in FIGS. 8A and 8B, the electric motor M is forced to stop and "0" is set in the M-flag when the seatback 4 reaches each operational ends at a raised side of the seatback 4 and at a reclined side thereof.

The seat driving apparatus according to the embodiment includes the emergency drive mode. In the emergency mode, the seatback 4 is operated to be positioned at the predetermined position at the high speed so that the occupant is restrained in the appropriate seating posture when the vehicle abnormally approaches the obstacle and the like. Therefore, when a signal of the emergency occurrence is sent from the vehicle state detecting ECU 100, an interrupt is executed and the electric motor M is driven at full power (the 100% duty ratio) to operate the seatback 4 to be positioned at the predetermined position.

According to the embodiment, a time for driving the electric motor M in the creep mode is defined by the timer. Instead, a time for driving the electric motor M may be defined by a rotational number of the electric motor M by using the signal from the rotation sensor MS. Further, a time for driving the electric motor in the seat operation mode at the first and second duty may be defined by the rotational number of the electric motor M, an operational angle signal from an operational angle sensor, which detects the operational angle of the seatback 4, or the like, instead of the timer.

Accordingly, when the seatback 4 is operated to the opposite direction from the previous operation thereof, the low load preparatory operation is provided. The low load preparatory operation is provided until the wedge members 53 are applied with the load for releasing holding of the gear transmission mechanism 5 by the wedge members 53. The electric motor M is driven in the creep mode, in which the seatback 4 is operated at a slower speed than a predetermined speed in the seat operation mode, during the low load preparatory operation.

According to the embodiment, the control unit 8 further includes the operational direction memorizing portion 86 memorizing the direction of the operation of the seatback 4.

Accordingly, when the electric motor M is controlled to be driven for operating the seatback 4, the previous operational direction of the seatback 4 (i.e., the previous driving direction of the electric motor M) is read. Consequently, the low load preparatory operation, which is provided when the present operational direction of the seatback is different from the previous operational direction thereof, is operated surely in the creep mode.

According to the embodiment, the seat driving apparatus further includes the timer setting the driving time in the creep mode.

The electric motor M is driven in the creep mode only during the low load preparatory operation before the wedge members 53 are applied with the load. A distance of the low load preparatory operation is determined by a structure of the gear transmission mechanism 5. Therefore, the time for the low load preparatory operation is calculated in relation to a speed of the creep mode. According to the embodiment, the timer for setting the calculated time of the low load preparatory operation (i.e., the driving time in the creep mode) is provided. Driving of the electric motor M in the creep mode is controlled by controlling the timer. Consequently, the driving control of the electric motor M in the creep mode is easily operated.

According to the embodiment, the gear transmission mechanism 5 includes the internal gear 52a, the external gear 51a having a less number of teeth than a number of teeth of the internal gear 52a and eccentrically rotated while engaging with the internal gear 52a, a shaft 54 rotatably displacing the wedge member 53 by applying a driving force of the actuator M to the wedge members 53. The wedge members 53 restrict a relative rotation of the internal gear 52a and the external gear 51a by being applied with the biasing force of the biasing member 55 in a direction in which an amount of eccentricity between the internal gear 52a and the external gear 51a is increased, the wedge members 53 thereby holding an engagement position between the internal gear 52a and the external gear 51a.

Accordingly, the low load preparatory operation is provided by the clearance S, which is generated between one of the wedge members 53 and the shaft 54. The low load preparatory operation of the shaft 54 is operated (i.e., the shaft 54 is rotated) in the creep mode and then the shaft 54 gently comes in contact with one of the wedge members 53 to apply the load to the wedge members 53. Consequently, holding of the wedge members 53 relative to the internal gear 52a and the external gear 51a is released. Subsequently, a rotatable displacement between the internal gear 52a and the external gear 51a relative to each other is started. Therefore, uncomfortable shaking is prevented from being transmitted to the seatback 4 in the above-described operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat driving apparatus comprising:
a gear transmission mechanism preventing a backlash by holding a gear engagement by means of a wedge member applied with a biasing force of a biasing member and transmitting a torque by displacing the wedge member;
an actuator operating a seatback of a seat via the gear transmission mechanism; and
a control unit controlling driving of the actuator,
wherein the control unit includes a seat operation mode in which the actuator is driven to operate the seatback at a predetermined speed and a creep mode in which the actuator is driven at a slower speed than the predetermined speed in the seat operation mode, and
wherein the actuator is driven in the creep mode until a load for releasing the holding of the gear transmission mechanism is applied to the wedge member and subsequently the actuator is driven in the seat operation mode when the seatback is operated in an opposite direction from the previous operational direction thereof.

2. The seat driving apparatus according to claim 1 wherein the control unit further includes an operational direction memorizing portion memorizing a direction of an operation of the seatback.

3. The seat driving apparatus according to claim 1 further including a timer setting a driving time in the creep mode.

4. The seat driving apparatus according to claim 1, wherein the gear transmission mechanism includes an internal gear, an external gear having a less number of teeth than a number of teeth of the internal gear and eccentrically rotated while engaging with the internal gear, a shaft rotatably displacing the wedge member by applying a driving force of the actuator to the wedge member, and wherein
the wedge member restricts a relative rotation of the internal gear and the external gear by being applied with the biasing force of the biasing member in a direction in which an amount of eccentricity between the internal gear and the external gear is increased, the wedge member thereby holding an engagement position between the internal gear and the external gear.

5. A seat driving apparatus comprising:
an actuator;
a gear-meshing type transmission mechanism adapted for being provided to a seat device having a seat cushion and a seat back rotatable relative thereto and associated with the actuator for being applied with a torque force while the actuator is on, the gear-meshing type transmission mechanism including a pair of meshing gears and a wedge member to which a force is applied from an elastic member, the gear-meshing type transmission mechanism being operated in such a manner that when the wedge member is displaced in one direction a tight mesh is established between the gears to prevent a backlash therebetween and when the wedge member is displaced in the other direction the torque force is transmitted to rotate the seat back relative to the seat cushion; and
a control unit controlling an operation of the actuator in either of normal and creep modes under which the seat back is rotated at a first speed and a second speed lower than the first speed, respectively,
wherein the control unit, when the seat back is requested to rotate in a direction which is different from a rotational direction of a preceding rotation of the seat back, causes the actuator to operate in the creep mode until the tight mesh between the gears is released and thereafter causing the actuator to operate in the normal mode.

6. The seat driving apparatus according to claim 5, wherein the control unit further includes a memory portion for memorizing therein the rotational direction of the seat back.

7. The seat driving apparatus according to claim 5 further comprising a timer setting driving time duration for the actuator to operate in the creep mode.

* * * * *